Oct. 23, 1945.  A. J. LOEPSINGER  2,387,668
CONTROL APPARATUS
Filed Oct. 19, 1942   3 Sheets-Sheet 1

Oct. 23, 1945.  A. J. LOEPSINGER  2,387,668
CONTROL APPARATUS
Filed Oct. 19, 1942   3 Sheets-Sheet 2

Albert J. Loepsinger,
Inventor:
by Harry Dexter Peck
Attorney

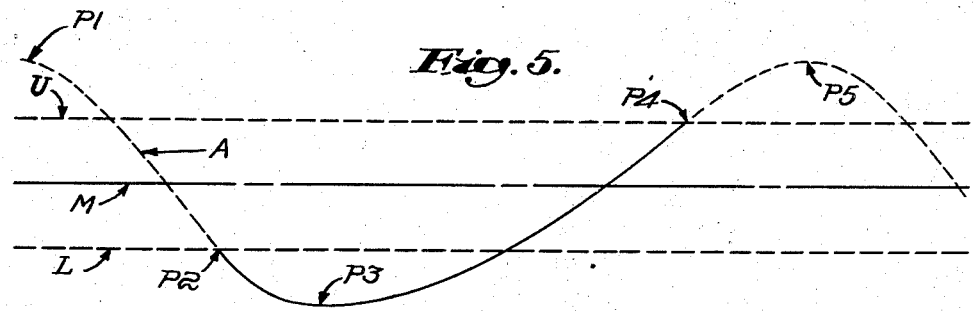
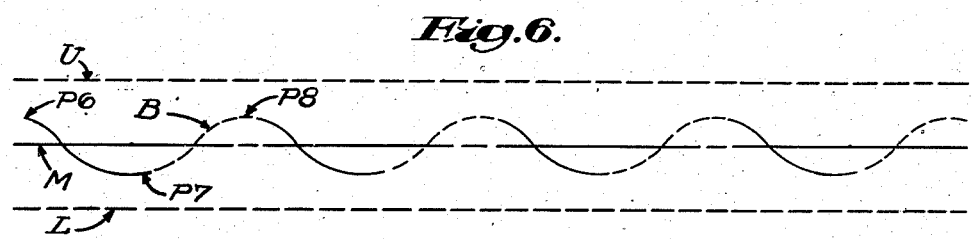
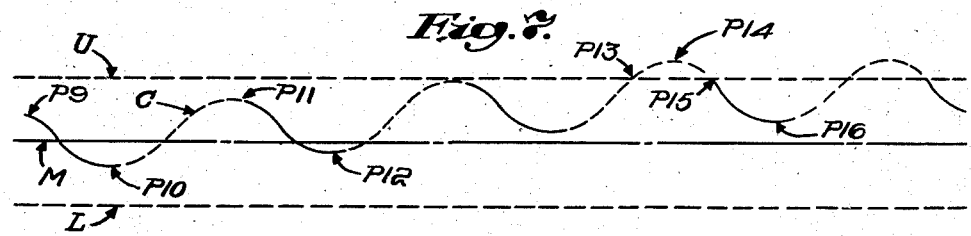
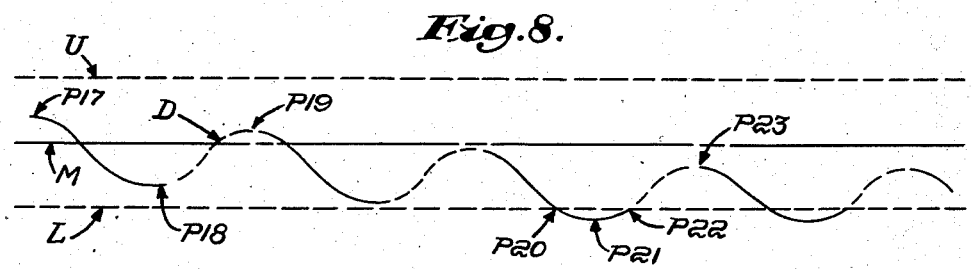

Patented Oct. 23, 1945

2,387,668

UNITED STATES PATENT OFFICE 2,387,668

CONTROL APPARATUS

Albert J. Loepsinger, Providence, R. I., assignor to Grinnell Corporation, Providence, R. I., a corporation of Delaware Application October 19, 1942, Serial No. 462,659

12 Claims. (Cl. 236—44)

This invention relates to improvements in control apparatus. More especially it has to do with control apparatus which seeks to maintain a condition within a predetermined range and which tends to minimize any overruns or departure beyond such range.

Control apparatus heretofore employed in an attempt to keep a condition within the limits of a desired range usually does not respond until one or the other limit is reached, and thus its corrective effects are initiated as the condition to be controlled passes outside of the desired range. Such control action necessarily results in undesirable overruns or departures beyond the limits sought to be maintained.

It is among the objects of this invention to reduce the overruns by providing for more frequent response of the control means with consequent shorter periods of action or inaction of the agency effecting the condition. It is a feature of the improved apparatus that it responds whenever the direction of a change of condition is reversed within a desired range. As a consequence, when other factors influencing the condition are favorable to its maintenance, the aforesaid periods of action or inaction may occur repeatedly within the desired range with no overruns whatever. And when such factors become unfavorable, causing the condition to go beyond either limit of the range, the control effects an approach to such limit in a series of short cycles so that when the limit is reached the unavoidable overrun beyond is appreciably minimized. It is a further object of the invention to provide that in the event of such a departure of the condition beyond either limit the corrective effect shall be exercised continuously until the condition is brought back within the desired range.

Examples of a change of condition which may be utilized to actuate control apparatus are the humidity change and the temperature change in the air of an inclosure, the pressure change of a gas or the change of level of a liquid in a container, the change of weight affecting a balance, the change of speed of a rotating element, the change in position of an armature within a magnetic field, and the like. To illustrate the application of the principles of my invention, I herein disclose apparatus for controlling the action of a humidifying means to the end that the relative humidity of the atmosphere of an inclosure may be maintained as much as possible within desired limits. In this showing the element responsive to changes in the relative humidity is representative of any element responsive to a change of condition, be it relative humidity, temperature, pressure, liquid level, weight, speed or what not. Likewise the relay device which effects the operation or stopping of the humidifying means is to be taken as indicative of any such device for transmitting the control action to some agency which affects the condition that is subject to change. Apart from these representative elements, the best mode in which I have contemplated applying the principles of my invention is shown in the accompanying drawings but these are to be deemed illustrative because it is intended that the patent shall cover by suitable expression in the appended claims whatever features of patentable novelty exist in the improvements disclosed.

In the drawings:

Figures 5, 6, 7 and 8 are curves showing characteristic actions of control apparatus.

Figure 1:
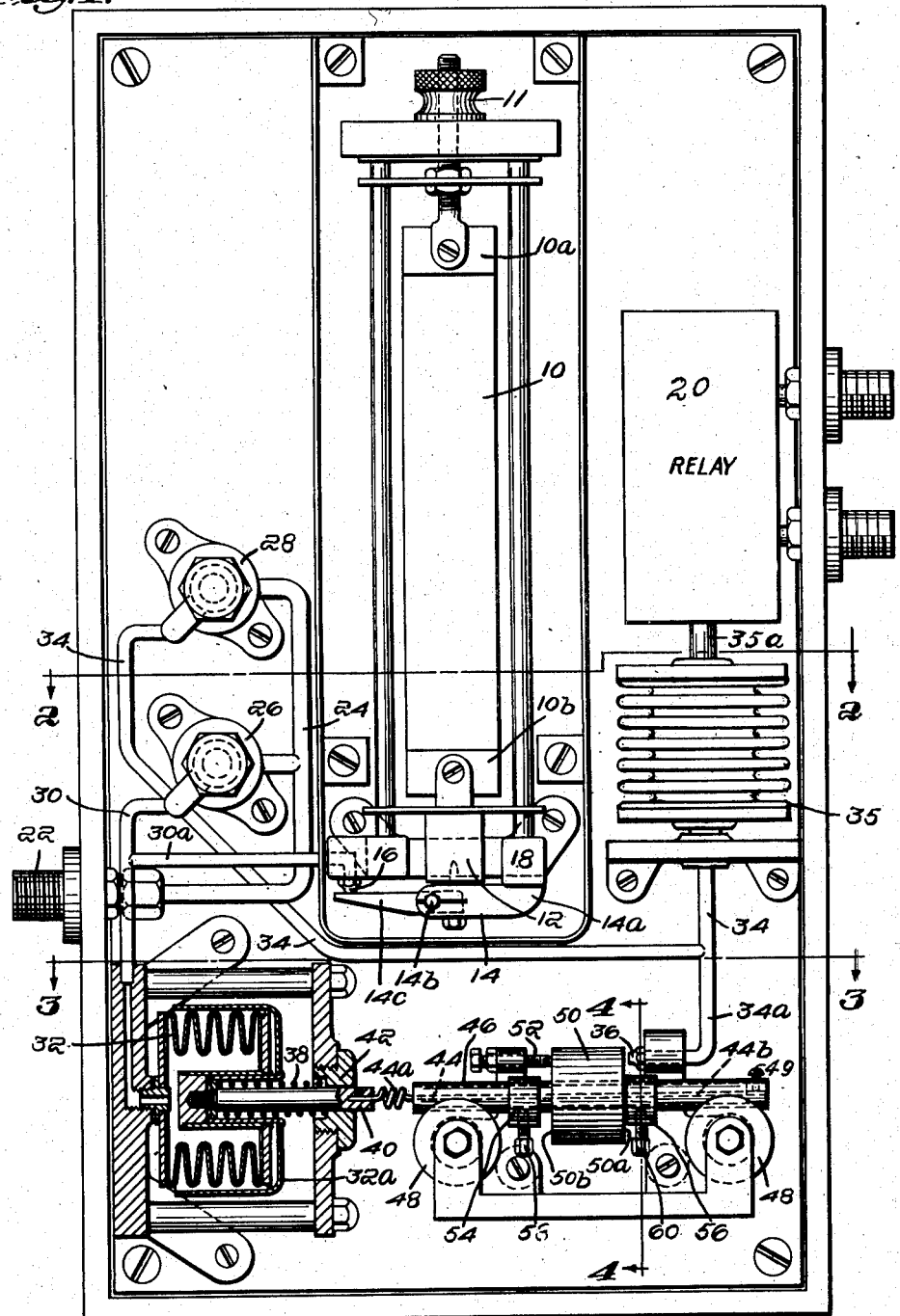
Figure 1 is a front elevation, partly in section, of control apparatus embodying my improvements.
Figure 2:
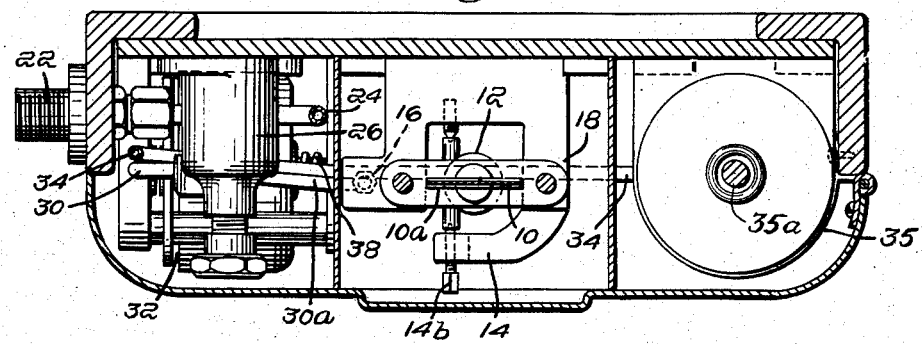
Figure 2 is a plan in section taken as on line 2—2 of Figure 1.
Figure 3:
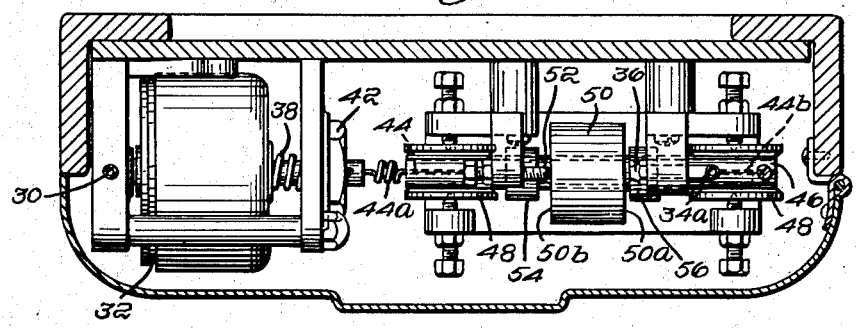
Figure 3 is another plan in section taken as on line 3—3 of Figure 1.
Figure 4:
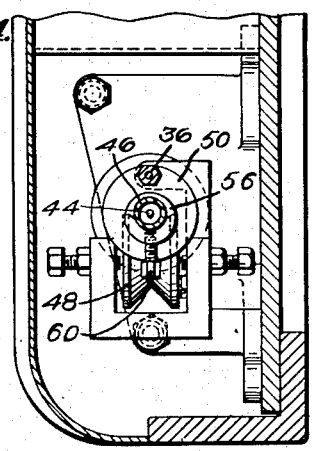
Figure 4 is an elevation in section taken as on line 4—4 of Figure 1.

Referring more particularly to Fig. 1 of the drawings the responsive element 10 herein disclosed for illustrative purposes is a strip of animal membrane which elongates upon taking up moisture and shortens upon giving up moisture and whose change in length corresponds closely with a change in the relative humidity of the atmosphere. Preferably the strip is vertically disposed with its upper end 10a adjustably secured. The position of this upper end may be determined by the thumb nut 11. Attached to the lower end 10b of the strip is a weight 12 which imposes only a mild tension on the membrane even when wholly carried by the strip. Usually this weight engages one arm 14a of a lever 14 which is somewhat off-balance with respect to its fulcrum 14b so that it tends to swing counterclockwise and move its other arm 14c away from a small fixed vent nozzle 16. If the elongation of the strip is sufficient the lever will eventually contact the nozzle and completely close its vent opening, and thereafter any further increase in the length of the membrane has no effect on the weight or lever. Reversely, as the strip shortens and raises the weight the lever swings counterclockwise away from the nozzle until it reaches a stop 18 and thereafter any further decrease in the length of the strip simply lifts the weight away from the lever.

Heretofore such a vent nozzle, lever valve and strip of membrane have been used in a control system having a direct connection between a restricted supply of pressure and a relay device 20 which affects the operation of the humidifying means. In such prior arrangements the response of the membrane to changes in the relative humidity has initiated a corrective effect upon departure of the relative humidity either way beyond a certain range. This has occasioned rather long periods of action or inaction of the humidifying means with consequent extended overruns beyond the limits desired. This characteristic performance of control apparatus heretofore customarily used is illustrated by the curve A of Fig. 5. The dotted portions of the curve indicate that the humidifying means are inactive while the full line portion indicates that they are in operation.

Assuming the condition of relative humidity desired is that represented by the dot-and-dash line marked M, the control apparatus is set for that particular condition. However, the control does not respond at that precise condition but at what may be called the upper and lower limits on opposite sides of the desired condition. These limits are represented in Fig. 5 by the dotted lines U and L respectively, and the space between them is termed the desired range.

Assume the relative humidity is at point P1 on the curve A, at some condition above the upper limit U, and falling. As it falls past this upper limit and past the desired mean condition M there is no response of the control means, but when the relative humidity reaches the lower limit L at point P2 the control acts to put the humidifying means in operation. Since the corrective effect is initiated as the relative humidity passes beyond the lower limit there is an unavoidable overrun beyond this limit after the humidifiers begin to discharge moisture into the air and before the fall of relative humidity is checked at some point P3 from which the relative humidity begins to rise. The humidifiers are continued in operation while the relative humidity is gaining in value and passing first the lower limit L and then the desired mean condition M. Not until the upper limit U is reached at point P4 and the relative humidity passes beyond the desired range is there initiated the corrective effect which renders the humidifying means inactive. Here again there is an unavoidable overrun beyond the upper limit U and not until some point P5 is reached does the relative humidity cease to rise and begin to fall.

Such overruns, both below the lower limit and above the upper limit are undesirable and the extended period of operation of the humidifying means represented by the full line portion of the curve between points P2 and P4 is particularly objectionable. During this period the atomizers or humidifying heads are discharging moisture into the air and if this discharge is continued for a sufficient length of time the humidity conditions near the humidifiers may become such that the evaporation is not rapid enough to prevent liquid particles from settling on whatever may be below. This sort of precipitation is most undesirable in that it may have damaging consequences.

It is the primary object of this invention to reduce those periods in which the humidifying means are active because it has been determined that if the same amount of moisture is discharged into the air during a series of spaced short periods of operation of the humidifying means as would be discharged during a long continuous period, the air will take up all of the moisture, and the relative humidity will be kept closer to the desired range. Accordingly, the purpose of my improved control apparatus is to effect the desired humidity conditions by more frequent and shorter periods of action of the humidifying means.

The same strip of animal membrane 10, the same vent nozzle 16 and lever valve 14, and the same relay device 20, as heretofore, may be employed but in addition to these elements I provide extremely sensitive pressure actuated means whereby the humidifying means are set in operation whenever the relative humidity is within a desired range and changes from a rising to a falling condition, and are rendered inactive whenever the relative humidity changes from a falling to a rising condition within the said range. Both the starting and stopping of the humidifiers take place without regard to the particular condition of relative humidity at which the reversal in direction of change of the relative humidity occurs. If the relative humidity should depart beyond either limit of the desired range, then the control apparatus is temporarily set to maintain the action or inaction of the humidifiers until the relative humidity is brought back within the limit from which such departure occurred.

In the preferred arrangement shown in the drawings, a supply of pressure, such as compressed air, is connected to an inlet fitting 22 and conducted by a pipe 24 to two separate restriction valves 26 and 28. From the first restriction valve 26 a pipe 30 leads to what I shall call a sensitive bellows 32, and from this pipe a branch 30a extends to the vent nozzle 16 associated with the lever valve 14 whose position is normally determined by the strip of membrane 10. From the second restriction valve 28 a second pipe 34 leads to what I shall term a relay bellows 35 and from this pipe a branch 34a extends to a second fixed vent nozzle 36.

Backing up the sensitive bellows 32 is a coiled spring 38 which is of such strength and so coordinated with the bellows that a very small change of pressure within the latter will cause a slight movement of the movable end 32a of the bellows. It is a feature of the apparatus that this very slight movement is more than ample to bring about the shifting of the relay device 20. The movable end of the sensitive bellows is attached to a guide rod 40 which extends within the coiled spring 38 and through a fixed guide sleeve 42, and has secured to its end a wire 44. The latter has a coiled portion 44a near the guide rod but therebeyond has a relatively long straight portion 44b extending through a cylindrical tubular rod 46 resting on V-shaped rollers 48 mounted on antifriction bearings. The end of the wire remote from the bellows 32 is attached to the end of the tubular rod by a set screw 49. Any expansion or contraction of the bellows, transmitted through the guide rod 40 and wire 44, effects a corresponding longitudinal movement of the tubular rod 46.

A weight 50 is slidably mounted on the tubular rod and has parallel end faces 50a and 50b each perpendicular to the axis of the tubular rod or longitudinal direction of its movement. One face 50a of this weight is opposite the second vent nozzle 36 and constitutes a valve for closing its opening. The other face 50b of the weight is opposite the end of an adjustable stop screw 52. By selective setting of the latter, the extent of movement of the weight can be determined since it can only move into contact with the fixed vent in one direction or into contact with the stop screw in the other direction. The effective operating movement of the weight is a few thousandths of an inch, usually less even than the slight expansion or contraction of the bellows and the corresponding movement of the tubular rod incident to small changes in the relative humidity. When the rod has moved the weight either against the nozzle or into contact with the adjustable stop screw, that is, through its effective operating movement, the weight will remain at rest while the rod continues to slide through it to whatever extent of movement is determined by the expansion or contraction of the bellows.

When the weight 50 closes the second vent nozzle 36 the pressure passing the second restriction valve 28 is all available to act upon the relay bellows 35. This pressure builds up very rapidly, expands the bellows and moves its stem 35a to shift the position of the relay device 20. Conversely, upon the weight moving away from the second vent nozzle 36 the pressure in the relay bellows rapidly escapes and the relay device is promptly shifted to its other position. The time required to shift the relay from one position to another can be regulated as desired by selecting the proper size of vent nozzle and adjusting the restriction valve to pass the desired pressure.

The action of the control apparatus under several typical conditions will now be described. In all examples let it be assumed that it is desired to maintain the relative humidity at a desired condition represented in Figs. 6, 7 and 8 by the mean line marked M. For purposes of comparison, the same upper and lower limit lines U and L respectively are shown as were drawn in Fig. 5 and the space between them may be deemed the desired range within which any condition of relative humidity would be considered satisfactory.

To initially adjust the instrument the relative humidity of the air bathing the strip of membrane is established at the desired condition represented by the mean line M. Incidentally there is a constant flow of room air over the strip 10 so that it is subjected at all times to an instant sample of the room atmosphere. With the relative humidity at the desired condition, the upper end 10a of the strip is adjusted by means of the thumb nut 11 to position the lever valve 14 with respect to the vent nozzle 16 so that air will escape therethrough at such a rate as to leave a sufficient pressure acting on the sensitive bellows 32 to hold the weight 50 against the vent nozzle 36. The adjusting screw 52 is set to provide the desired effective operating movement of the weight away from this nozzle, a movement of a few thousandths of an inch. Since the vent opening is closed, the pressure passed by the second restriction valve 28 is all available in the relay bellows 35 to expand the latter and hold the relay device 20 in position to keep the humidifying means inactive. So long as the relative humidity remains at the desired condition nothing more occurs. But in practice the relative humidity does not naturally remain constant as many factors affect it and cause it to vary frequently.

If the relative humidity falls the membrane strip will shorten, the lever 14 will swing counterclockwise and more air will escape through the vent nozzle 16. The air pressure within the sensitive bellows 32 will fall and permit it to contract. This action causes the guide rod 40, wire 44 and tubular rod 46 to move to the left (to the positions shown in Fig. 1) and thus move the weight 50 against the adjusting screw 52. Immediately air begins to escape through the second vent nozzle 36 and thus the pressure on the relay bellows 35 is promptly reduced permitting it to contract and shift the relay device 20 to its position effecting the starting of the humidifying means. Presumably, whatever has caused the assumed fall in relative humidity will continue and before the operation of the humidifying means has checked it the relative humidity will have gone still lower, the membrane strip will have further shortened, the lever valve 14 will have moved farther away from the first vent nozzle 16 and the rate of escape of air therethrough will have increased. The sensitive bellows 32 will have contracted still further and caused the tubular rod 46 to move farther to the left. But this will effect no further movement of the weight 50 because the first portion of the movement of the rod placed the weight against the adjusting screw, and thereafter any additional movement of the rod in the same direction results only in the rod sliding through the weight.

Before long the operation of the humidifying means will have checked the fall in relative humidity and caused the latter to begin rising. The membrane will begin to elongate and cause the lever valve 14 to swing toward the vent nozzle 16. The rate of escape of air will promptly be reduced and more pressure imposed on the sensitive bellows 32. This will cause the bellows to expand slightly and thereby push the tubular rod 46 and weight 50 to the right to close the second vent nozzle 36. This cuts off all escape of the air from the pipe line 34 to the relay bellows 35 and so the pressure on the latter is rapidly built up causing it to shift the relay device 20 into position to stop the humidifying means. Thus it is clear that upon a reversal in direction of the change of condition—in this instance the direction of a falling relative humidity being reversed to that of a rising relative humidity—the control responds and acts to stop the operation of the humidifying means. If the relative humidity continues to rise and the membrane continues to lengthen, the lever valve 14 will approach closer to the vent nozzle 16 and more pressure will be imposed on the sensitive bellows 32. The latter will accordingly expand and push the tubular rod 46 further to the right, but since in the first portion of its movement in this direction the weight 50 was set against the vent nozzle 36, further movement of the rod results in the rod simply sliding through the weight.

With the humidifying means inactive, it may be assumed that the relative humidity will soon cease to rise and again begin to fall. When this change in direction causes the membrane to shorten, the lever valve 14 will swing away from the vent nozzle 16, the rate of escape of air will increase and the pressure on the sensitive bellows 32 will be reduced. The latter will at once contract slightly and pull the tubular rod 46 to the left. The initial movement of the rod in this direction moves the weight 50 back against the adjusting screw 52, thus opening the vent nozzle 36 of the relay pressure system. The pressure on the relay bellows 35 will rapidly fall permitting the relay 20 to shift to its position where the humidifiers are put in operation. Thus it is clear that promptly upon a change in direction from a rising to a falling relative humidity the control responds and acts to start the humidifying means.

The operations just described and the resulting conditions of relative humidity is illustrated by the curve B of Fig. 6. The desired condition of relative humidity is represented by the dot-and-dash line M, the upper limit by the dotted line U, and the lower limit by the dotted line L. Likewise the portions of the curve which are dotted indicate that the humidifying means are inactive, and the full line portions of the curve indicate when these means are in operation.

Starting at point P6 on the curve B of Fig. 6, the relative humidity is beginning to fall just after a preceding rise. Such reversal of direction will have caused the humidifying means to go into operation as indicated by the full line of the curve. Despite the action of the humidifiers the relative humidity will fall, but not to any great extent because the discharge of moisture into the air soon checks the fall and causes the change in relative humidity to be reversed from a falling to a rising condition, say at point P7 on curve B. This reversal promptly renders the humidifying means inactive, and they remain inactive during the subsequent rise in relative humidity from point P7 to point P8 where the change is again reversed, this time from a rising to a falling condition. This brings about the starting of the humidifiers and their action is continued during the subsequent fall of the relative humidity.

Thus it is that with my improved control apparatus the proper corrective effect is initiated whenever the change of condition reverses in direction, or, in other words, when a corrective effect has overcome a change in one direction and a change in the reverse direction begins, the opposite corrective effect is promptly imposed to resist the new change. Applying this general statement to the specific embodiment of control apparatus disclosed herein for illustrative purposes, it may be said that when the relative humidity is within the desired range and begins to fall the humidifying means are put in operation and are continued in operation so long as the relative humidity continues to fall, thus imposing a corrective effect against such fall. But when the fall is overcome within the desired range and the change of condition is reversed to a rising relative humidity, the humidifying means are rendered inactive and are continued inactive as long as the relative humidity continues to rise, thus imposing a corrective effect against such rise. Since the corrective effect is begun when the change begins the extent of the change in either direction is necessarily shortened. While in the specific illustration herein, the reduction in the length of the periods of inoperation are not of first importance, the contrary is true with respect to periods of operation of the humidifying means. These are so shortened by my improved control apparatus that the air is capable of accepting and retaining all of the moisture discharged and thus all danger of precipitation is avoided.

In the discussion of curves A and B, it has been assumed that the factors affecting the relative humidity have been favorable to the maintenance of the relative humidity within a permissible range. When this is so, the curve B will usually remain within the predetermined limits of the desired range and the relative humidity will closely approximate the mean of that range. Usually, however, one or more of the factors referred to do not continue so favorable. For instance, the heat load in the inclosure may change materially, as when a group of machines are put in operation or stopped for any reason. The sun may be cut off by clouds, a cooling shower may fall, or for any other reason the outside temperature may so change as to effect appreciably the temperature conditions within the inclosure. If there is provision for the admission of fresh outside air to the inclosure and the simultaneous discharge of humidified air from the inclosure, changes in the moisture content of the entering air will also affect the humidity condition, sometimes favorably and at other times unfavorably. Despite such variations in the more or less uncontrollable factors, the control apparatus herein under discussion must nevertheless seek to maintain the relative humidity within the desired range and, if this can not be done, then the apparatus must try to minimize the unavoidable departures outside the desired range. This function of the improved control apparatus will now be described.

Assume the heat load in the inclosure falls or that air admitted from outside is richer in moisture, either of which factors would make it possible for the same humidifying means to increase the relative humidity with less input of moisture than was the case illustrated by curve B. Referring to Fig. 7 and curve C thereof, assume that at point P9 the conditions are as they were assumed to be at point P6 of curve B, with the relative humidity falling and the humidifying means in operation. Because of the assumed factors favorable to the moisture condition in the room the relative humidity stops falling a little sooner than it did before and begins to rise again, as indicated at point P10 on curve C. This reversal in the direction of change of the relative humidity brings about the stopping of the humidifiers. The relative humidity continues to rise however and, because of the assumed favorable factors, reaches a somewhat higher condition at point P11 before its rise ceases and it again starts to fall. It does not drop quite so low as before but at some point such as P12 its fall is reversed to a rise. Thus with each cycle of operation and inaction, the relative humidity gradually increases toward the upper limit U until at some point, such as P13, the relative humidity actually rises above the upper limit and reaches a point P14 before it begins to fall. If at this reversal in direction of change the humidifying means were set in operation, the cycles could go on indefinitely, gradually raising the relative humidity to a high per cent quite unsatisfactory for any degree of comfort or for the proper processing of materials in the inclosure. But such a "run away" performance is not permitted because means are provided in the apparatus to prevent any operation of the humidifying means whenever the relative humidity is above the upper limit U, and to continue the humidifiers in operation whenever the relative humidity is below the lower limit L.

These means are adjustable stops 54 and 56 on the tubular rod 46, on opposite sides of the weight 50. To position the stop 54, the condition of relative humidity at the membrane is established at the upper limit U of the predetermined range. This will of course have moved the weight 50 into contact with the vent nozzle 36 and pushed the tubular rod through the weight to the right. The stop 54 on the left side of the weight is then moved into contact with the weight and fastened to the tubular rod by a set screw 58. To position the other stop 56 the condition of relative humidity at the membrane is established at the lower limit L. This will have moved the weight 50 against the adjusting screw 52 and pulled the rod 46 through the weight to the left. The stop 56 on the right side of the weight 50 is then moved into contact with the weight and fastened to the tubular rod by a set screw 60. Obviously, with the stops thus secured, the tubular rod is limited in its movements, corresponding to the predetermined range of relative humidity between the upper and lower limits. To protect the sensitive bellows 32 when the relative humidity exceeds either limit of this range, the coiled portion 44a of the wire 44 acts as a spring and permits the bellows 32 and guide rod 40 to move without causing movement of the tubular rod 46 beyond the limits determined by the setting of the stops 54 and 56.

Referring again to Fig. 7, when the relative humidity in rising on the curve C reaches point P13 at the upper limit U, the stop 54 will have been moved into contact with the weight 50 which has previously been closed against the second vent nozzle 36 to stop the humidifiers. As the relative humidity continues to rise from point P13 to point P14 the sensitive bellows 32 continues to expand but this only results in the compression of the spring portion 44a of the wire 44.

At point P14 the relative humidity changes from a rising to a falling condition, the membrane 10 begins to shorten, the lever valve 14 begins to move away from the first vent nozzle 16 and the pressure in the sensitive bellows begins to decrease. As the bellows contracts during the fall of the relative humidity from the point P14 to point P15 at the upper limit U, the spring portion 44a of the wire 44 merely expands. There is no change in position of the extended portion 44b of the wire or of the tubular rod 44, the stop 54, and weight 50. But when the falling relative humidity passes the upper limit U the spring portion 44a of the wire is back to normal and thereupon the wire is pulled to the left by the contracting sensitive bellows 32 and thus the tubular rod 46, the stop 54 and weight 50 are moved to the left to effect opening of the second vent nozzle 36. This brings about the starting of the humidifiers substantially at the point P15 and they continue in action until at some point P16 on the curve where the relative humidity reverses from a falling to a rising condition. Thus the period of operation is appreciably reduced due to the delayed starting of the humidifiers under the influence of the stop 54, and because a lesser quantity of moisture is discharged into the air during this shortened period of operation the succeeding rise of the relative humidity is curtailed and the overrun beyond the upper limit is appreciably minimized.

This cycle may be repeated as long as the reduced period of operation of the humidifiers is sufficient to maintain the relative humidity in the neighborhood of the upper limit of the desired range. If other factors assume control, as it were, and bring about a condition of relative humidity persistently above the upper limit, then the control apparatus will keep the humidifiers inactive until such time as the relative humidity falls below the upper limit. Then the apparatus will take up its cycling function and start and stop the humidifiers as heretofore explained.

The curve D of Fig. 8 is similar to curve C except that in this example it is assumed that the factors affecting the relative humidity are unfavorable to the moisture condition of the inclosure and require the humidifying means to be active for somewhat longer periods. For instance, the heat load may be considerably increased or the air taken into the inclosure may be relatively dry. In either event, the humidifiers must introduce more moisture than under the conditions assumed when the curves B and C were discussed.

Starting at point P17 and assuming as before that the relative humidity is falling with the humidifying means in action. The relative humidity, due to the assumed unfavorable factors, falls to point P18 before its direction of change is reversed and the humidifiers are shut off. Still due to the unfavorable factors the relative humidity only rises to the point P19 before it again begins to fall. Repeated cycles under the assumed unfavorable conditions will result in a gradual reduction in relative humidity until at some such point as P20, it will fall below the lower limit L of the desired range. When this occurs the stop 56 will have come into contact with the weight 50 which at the moment will be against the adjusting screw 52. As the relative humidity continues to fall below the lower limit, from point P20 to point P21, the sensitive bellows 32 is further contracted but now this merely expands the spring portion 44a of the wire 44. The tubular rod 46, the stop 56 and weight 50 do not move nor do they move while the relative humidity is rising again from point P21 back to the lower limit at point P22. But when this point is reached, the spring portion 44a of the wire 44 will be back to normal again and as the relative humidity passes the lower limit at point P22, the wire, tubular rod, the stop and weight are moved to the right, the second vent nozzle is closed and the humidifying means are rendered inactive. The relative humidity rises to point P23 and then begins to fall, causing the humidifying means to be started. This operation continues as the relative humidity falls past the lower limit to the point of reversal, and also during the rise from this latter point back to the lower limit. Thus, when factors are unfavorable the humidifying means are kept in action for a somewhat longer period which appreciably lessens the overrun below the lower limit.

Whenever the relative humidity goes below the lower limit or above the upper limit, its departures beyond those limits are minimized because the approach to either limit is by repeated short cycles. The corrective effect which eventually causes the relative humidity to go beyond either limit is not great and therefore the departure outside the predetermined range is appreciably reduced.

Thus the improved control apparatus is characterized by several principal features. One is that it responds whenever the direction of a change of condition is reversed within the desired range. Another is that whenever the reversals occur outside a desired range the controlled agency is maintained inactive or in operation according to which limit of the range has temporarily been exceeded. Still another feature is that the control effects short and frequent cycles of operation which avoid undesirable precipitation and minimize departures of the relative humidity beyond the range limits. Underlying these principal features are those of unusual sensitivity and rapidity of action which enhance the attainment of the characteristic features.

I claim:

1. Control apparatus for controlling the operation of an agency affecting a condition in order to maintain the condition within the limits of a desired range, comprising means responsive to changes in the condition; a valve actuated by said means to produce changes in the effective pressure imposed upon a sensitive pressure responsive device; an element movable in accordance with said pressure changes; a second element slidably mounted on the first said element and movable thereby; a fluid supply system for effecting the action or inaction of said agency having a vent located in the path of movement of said second element whereby its extent of travel with the first said element in direction toward the vent is limited; and means located in the path of movement of said second element for limiting the extent of its travel with the first said element away from the vent opening; the said vent being closed by said second element upon reversal within the range of the changes in the condition in one direction and being opened by said second element upon reversal within the range of the said changes in the opposite direction, thereby to initiate a corrective effect by the said agency to overcome the change in condition causing either reversal.

2. Control apparatus for controlling an operative agency affecting a condition in order to maintain the condition within the limits of a desired range, comprising means responsive to changes in the condition; a valve actuated by said means to produce changes in the effective pressure imposed upon a sensitive pressure responsive device; an element movable in accordance with said pressure changes; a second element slidably mounted on the first said element and movable thereby; a fluid supply system for effecting the action or inaction of said agency having a vent located in the path of movement of said second element whereby its extent of travel with the first said element in direction toward the vent is limited; and means located in the path of movement of said second element for limiting the extent of its travel with the first said element away from the vent opening; the said vent being closed by said second element when the condition is within the range and its direction of change is reversed toward one of said limits, and being opened by said second element when the condition is within the range and its direction of change is reversed toward the other of said limits, thereby to initiate a corrective effect by said agency to overcome the change in condition causing either reversal.

3. Control apparatus for controlling humidifying means in order to maintain a humidity condition within an inclosure, within a desired range, comprising means responsive to changes in said condition; means actuated by said responsive means for setting the humidifying means in operation when the said humidity condition is within the desired range and changes from a rising to a falling condition and rendering said humidifying means inactive when the said humidity condition is within the desired range and changes from a falling to a rising condition; and means preventing actuation of the said actuated means when said changes occur outside the said range.

4. Control apparatus for controlling humidifying means in order to maintain a humidity condition within the limits of a desired range, comprising means responsive to changes in said condition; means actuated by said responsive means, upon reversal of the direction of change of the humidity condition occurring within the said limits, for causing the humidifying means to produce an effect on the humidity condition opposing the change causing said reversal; means preventing actuation of the said actuated means when said reversal occurs outside of either limit; and means enabling the prevented actuation to occur upon the said condition returning to within the said range.

5. Control apparatus for controlling humidifying means in order to maintain a humidity condition within the limits of a desired range, comprising means responsive to changes in said condition; and means actuated by said responsive means for setting the humidifying means in action when the condition is within the said range and its direction of change is reversed toward one of said limits, and for rendering the said humidifying means inactive when the condition is within the said range and its direction of change is reversed toward the other of said limits.

6. Control apparatus for controlling humidifying means in order to maintain a humidity condition within the limits of a desired range, comprising means responsive to changes in the said condition; means actuated by said responsive means, when the condition is within the said range and its direction of change is reversed toward either of said limits, for initiating a corrective effect by said humidifying means tending to prevent the condition from exceeding the limit toward which it is changing after said reversal; and means preventing the actuation of said actuated means whenever a reversal occurs outside the limits of said range.

7. Control apparatus for controlling humidifying means in order to maintain the humidity condition within the limits of a desired range, comprising means responsive to changes in the said condition; means actuated by said responsive means, when the condition is within the range and its direction of change is reversed toward either of said limits, for initiating a corrective effect by said humidifying means tending to prevent the condition from exceeding the limit toward which it is changing after said reversal; and means effective to continue said corrective effect while the condition is beyond the last said limit.

8. Control apparatus for controlling humidifying means in order to maintain the humidity condition within the limits of a desired range, comprising means responsive to changes in the said condition; means actuated by said responsive means to prevent action of the humidifying means when the condition exceeds one of said limits and to continue said humidifying means in action when the condition exceeds the other of said limits; and means also actuated by said responsive means for rendering the said humidifying means inactive when the condition is within the said range and its direction of change is reversed toward the said one of said limits, and for setting the said humidifying means in action when the condition is within the said range and its direction of change is reversed toward the said other of said limits.

9. Control apparatus for controlling humidifying means in order to maintain a humidity condition within a desired range, comprising means responsive to changes in the said condition; a valve actuated by said means to produce changes in the effective pressure imposed upon a sensitive pressure responsive device; an element movable in accordance with said pressure changes; a second element slidably mounted on the first said element and movable thereby; a fluid supply system for effecting the action or inaction of the humidifying means having a vent located in the path of movement of said second element whereby its extent of travel with the first said element in direction toward the vent is limited; and means located in the path of movement of said second element for limiting the extent of its travel with the first said element away from the vent opening; the said vent being closed by said second element upon reversal within the said range of the changes in the condition in one direction and being opened by said second element upon reversal within the said range of the said changes in the opposite direction, thereby to initiate a corrective effect by the said humidifying means to overcome the change in condition causing either reversal.

10. Control apparatus for controlling humidifying means affecting a humidity condition which is desired to be maintained within the limits of a desired range, comprising means responsive to changes in the said condition; a valve actuated by said means to produce changes in the effective pressure imposed upon a sensitive pressure responsive device; an element movable in accordance with said pressure changes; a second element slidably mounted on the first said element and movable thereby; a fluid supply system for effecting the action or inaction of the said humidifying means having a vent located in the path of movement of said second element whereby its extent of travel with the first said element in direction toward the vent is limited; and means located in the path of movement of said second element for limiting the extent of its travel with the first said element away from the vent opening; the said vent being closed by said second element when the condition is within the range and its direction of change is reversed toward one of said limits, and being opened by said second element when the condition is within the range and its direction of change is reversed toward the other of said limits; and means associated with the first said element adapted to prevent movement of the second element when any reversal in direction of change of condition occurs outside either limit of said range; the last said means permitting movement of the second element upon the said condition returning to within said range.

11. Control apparatus for controlling humidifying means affecting the humidity condition within an inclosure, comprising means responsive to changes in said condition; and means actuated by said responsive means for setting the humidifying means in operation when the said humidity changes from a rising to a falling condition and rendering said humidifying means inactive when the said humidity changes from a falling to a rising condition.

12. Control apparatus for controlling an operative agency affecting a condition in order to maintain the condition within the limits of a desired range; comprising means responsive to changes in the condition; means actuated by said responsive means for rendering the said agency inactive when the condition is within the said range and its direction of change is reversed toward one of said limits, and for setting said agency in action when the condition is within the said range and its direction of change is reversed toward the other of said limits; and adjustable means associated with the last said means for preventing action of the said agency when the condition exceeds one of said limits and for continuing said agency in action when the condition exceeds the other of said limits.

ALBERT J. LOEPSINGER.